Aug. 30, 1966  TAKUZO TSUCHIYA ETAL  3,269,198
VARIABLE THRUST OSCILLATOR

Original Filed Jan. 25, 1963  4 Sheets-Sheet 1

INVENTORS
TAKUZO TSUCHIYA
CLIFTON H. MORRISON
BY
William C. Babcock
ATTORNEY

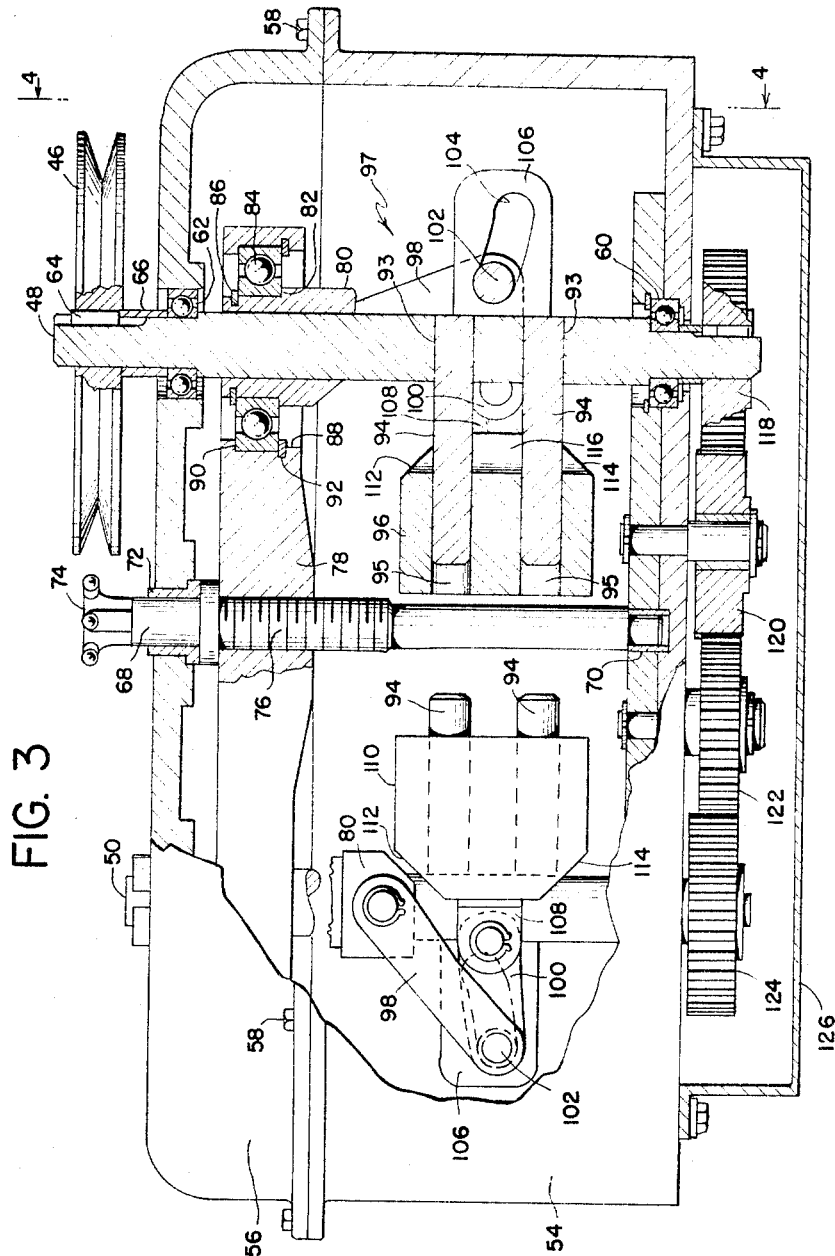

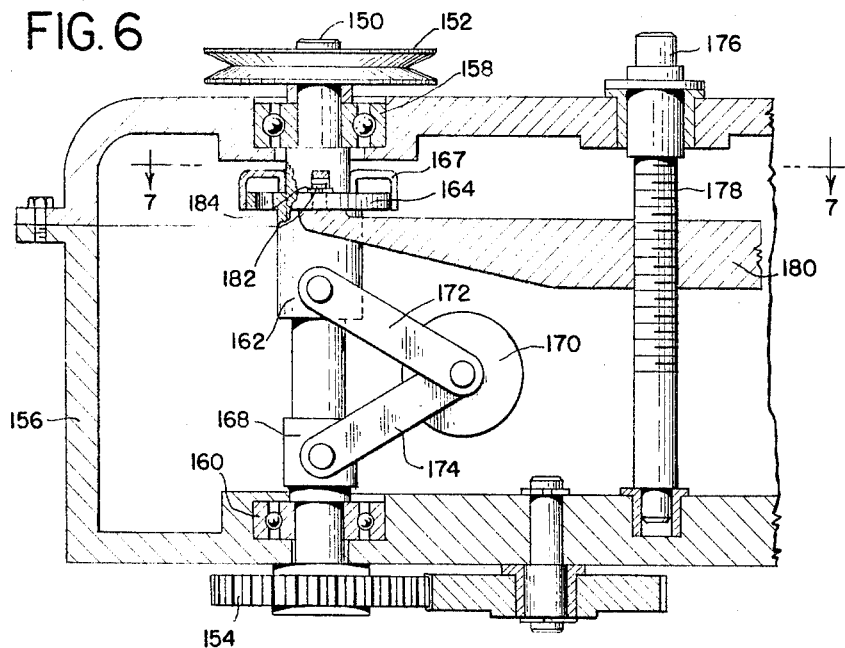
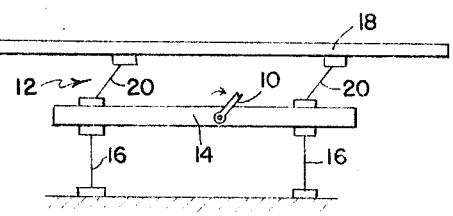
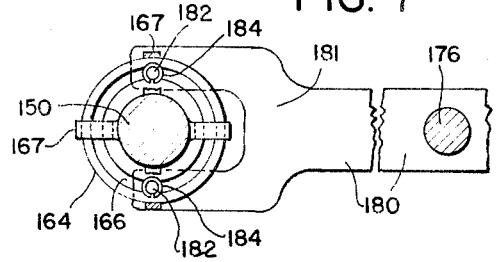
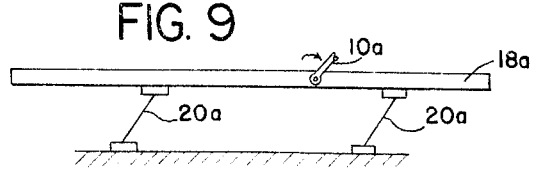
INVENTORS
TAKUZO TSUCHIYA
CLIFTON H. MORRISON 3,269,198
VARIABLE THRUST OSCILLATOR
Takuzo Tsuchiya, Minneapolis, and Clifton H. Morrison, St. Paul, Minn., assignors to General Mills, Inc., a corporation of Delaware
Continuation of application Ser. No. 253,933, Jan. 25, 1963. This application May 5, 1965, Ser. No. 456,891
3 Claims. (Cl. 74—61)

This application is a continuation of our prior application Serial No. 253,933, filed January 25, 1963, now abandoned.

This invention relates to a device for producing a vibratory force, and more particularly to an oscillator or vibrator for use with a conveyor platform or the like, which can be adjusted to produce a variable vibratory force while the oscillator or vibrator is in operation.

Various types of oscillators or vibrators for causing a vibratory conveyor, screen, oven, or other similar vibratory device to vibrate, are well known in the art. Such devices normally include one or more rotatable eccentric weights which cause the conveyor or similar device, to vibrate at a prescribed amplitude, as the weight is rotated. If two or more eccentric weights are used, they are usually caused to rotate in opposite directions by mounting them on two shafts which are caused to rotate in opposite directions. A motor is provided for rotating one of the shafts in one direction, and appropriate means is provided for rotating the second shaft in the opposite direction.

Oscillators for causing a conveyor platform to vibrate are generally attached either directly to the conveyor platform, hereinafter referred to as a one-mass system; or indirectly to the conveyor platform, by direct attachment to an intermediate frame to which the platform is attached, hereinafter referred to as a two-mass system. If the one-mass system is used, the conveyor platform is normally suspended by mounting it on the ends of at least two springs, the other ends of said springs being secured to a stationary support. The oscillator is attached directly to the conveyor platform, and as the oscillator is actuated, it imparts vibratory motion to the platform. On the other hand, if the two-mass system is used, the conveyor platform is normally suspended by mounting it on the ends of at least two springs, the other ends of said springs being secured to an intermediate frame support, the frame support in turn being suspended by mounting it on the ends of at least two additional springs, the other ends of said additional springs being secured to or positioned on a stationary support. The oscillator is attached directly to the intermediate frame support, and as the oscillator is actuated, a force is transmitted to the conveyor platform, and a vibratory motion is imparted to the platform, thus causing it to vibrate. Both of these systems are now well known in the art and will not be described in further detail. Such a two-mass system for example, is described and claimed in Patent No. 2,951,581, which issued on September 6, 1960. The present invention can readily be used in both systems.

Ofttimes it is desirable to increase or decrease the magnitude of the vibratory force created by an oscillator. According to the known state of the art, this is normally accomplished by changing the relative position of the eccentric weights with respect to each other, while the device is not in operation. This often requires the operator to interrupt the conveying or screening procedure, while the phase relationship of the weights with respect to each other is changed. Moreover, this often requires that the oscillator be at least partially disassembled so that the relative position of the weights might be changed.

Accordingly, one object of the present invention is to provide an improved oscillator for producing a vibratory force and imparting vibratory motion to an object, with means for varying the effective force during operation.

Another object is to provide an oscillator whereby the vibratory force of the oscillator might be varied from a minimum magnitude to a maximum magnitude, or vice-versa, while the oscillator is in operation.

A further object is to provide an oscillator in which the position of an eccentric mass relative to its supporting shaft is radially adjustable, so that the vibratory force created by the oscillator might be varied while the oscillator is in operation.

A still further object is to provide a mechanism for varying the relative position of two eccentric weights mounted on two counter rotating shafts, with respect to said shafts, so that the component of vibratory force might be varied from a minimum magnitude to a maximum magnitude, or vice-versa, while the oscillator is in operation.

A still further object is to provide a variable thrust oscillator which can be used with either a one-mass system or a two-mass system.

Other objects and advantages of this invention will become apparent from a consideration of the following specification and accompanying drawings. Before proceeding with a detailed description of the invention however, a brief description of it will be presented.

The oscillator of the present invention is comprised of a housing which is attached either directly or indirectly to a conveyor platform, or other similar device. At least one shaft is rotatably mounted in the housing, and an eccentric weight is attached to the shaft in such a manner as to be radially adjustable toward or away from the longitudinal axis of the shaft. Preferably, two parallel shafts are rotatably mounted within the housing, and an eccentric weight is attached to each shaft in such a manner that the weights are phased 180° apart with respect to each other, and further, in such a manner that each weight may be displaced radially away from or toward the longitudinal axis of its respective shaft, said displacement changing the vibratory force created by the oscillator. A motor is provided for actuating the oscillator by rotating one of the shafts in one direction; the other shaft is caused to rotate in the opposite direction by appropriate means.

In each case, an adjusting member is provided which effectively moves each weight radially with respect to its respective shaft so that the component of vibratory force created by the oscillator might be varied from a minimum magnitude to a maximum magnitude, or vice-versa, while the oscillator is in operation.

The invention will best be understood by reference to the following drawings, wherein:

FIG. 3 is an enlarged sectional view of the oscillator with parts broken away, taken along line 3—3 of FIGURE 1;

FIG. 6 is a partial elevational view illustrating a different embodiment of the invention.

FIG. 7 is a partial view taken along line 7—7 of FIG. 6;

FIG. 8 is a schematic diagram of the device of FIG-

URE 1 in side elevation, which illustrates a two-mass system; and,

FIG. 9 is a similar schematic view illustrating a one-mass system.

Figure 2:
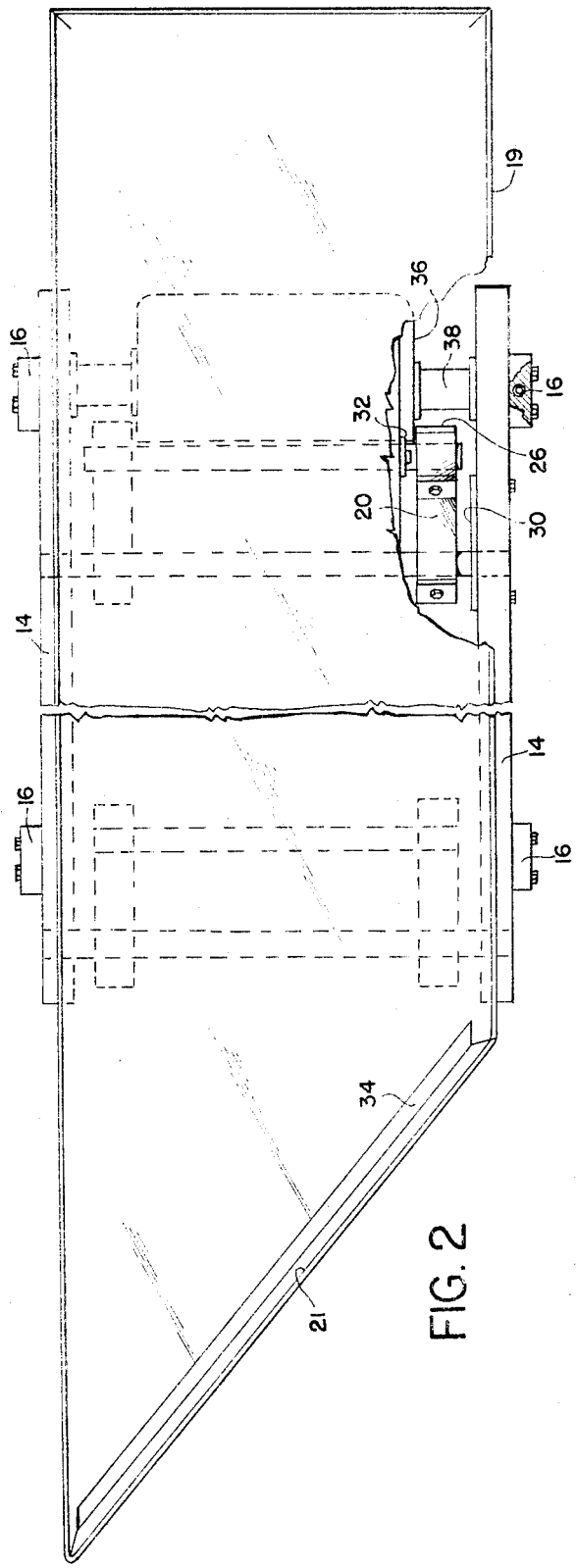
FIG. 2 is a top plan view with parts broken away, illustrating the conveyor depicted in FIGURE 1.
Figure 1:
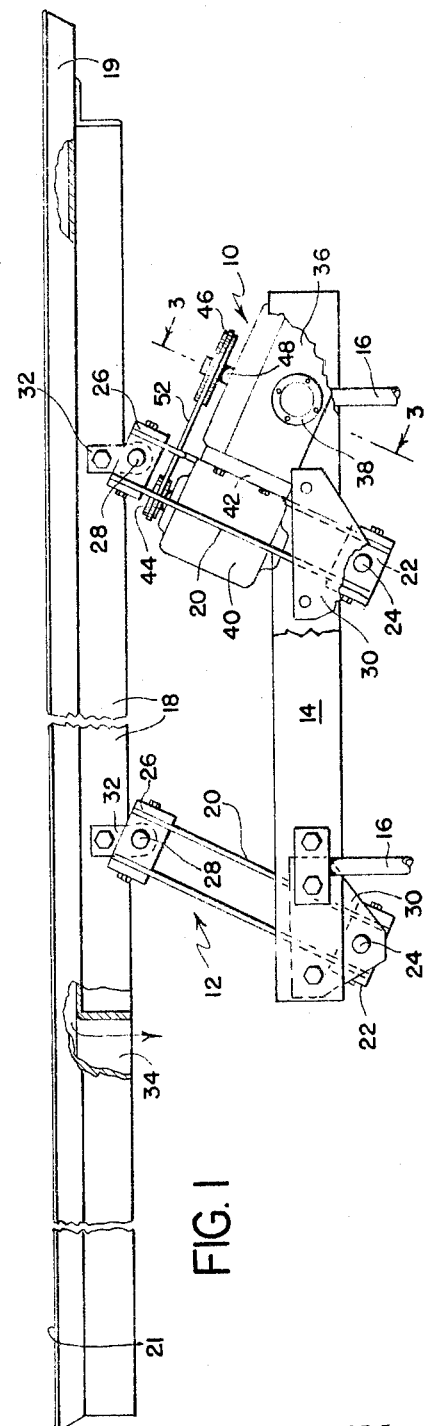
FIGURE 1 is a side elevational view with parts broken away, illustrating an oscillator attached to a vibratory conveyor.
Figure 4:
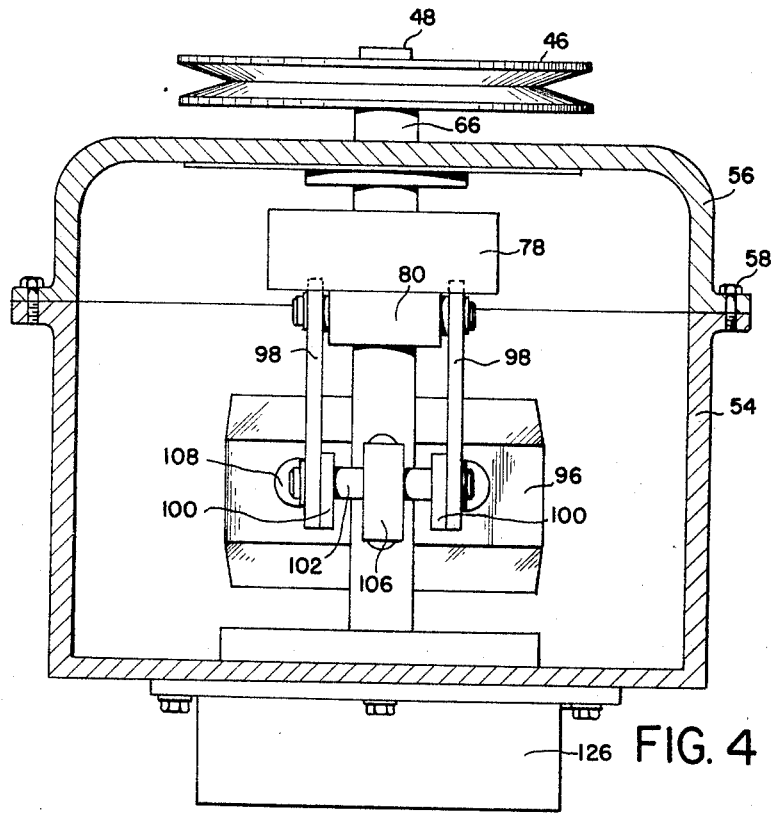
FIG. 4 is a sectional view of the oscillator taken along line 4—4 of FIG. 3.

FIGURE 1 illustrates an oscillator designated generally by reference numeral 10, mounted so as to transmit a vibratory force to a feeder or conveyor 12 thereby causing it to vibrate at a prescribed amplitude. It must be recognized, that although the invention is shown in conjunction with a feeder or conveyor, it might readily be used with other types of vibratory devices as well, such as vibratory screens, vibratory ovens, and the like. The system depicted in FIGURE 1 is a two-mass system, as described briefly hereinbefore, and is illustrated schematically in FIG. 8. As noted in FIG. 8, the oscillator 10 is attached directly to an intermediate support frame 14, and only indirectly to a feeder pan 18. The feeder pan 18 is mounted on springs 20 and the support frame 14 is mounted on spring legs 16. A vibratory force is transmitted to the feeder pan 18 as the oscillator is actuated, even though the frame 14 remains relatively stationary. FIG. 9 on the other hand, illustrates a one-mass system. The oscillator 10a is attached directly to the feeder pan 18a, and as the oscillator is actuated, a vibratory motion is imparted to the feeder pan 18a. The feeder pan 18a is mounted on the springs 20a, which are attached to a stationary support or floor.

Referring again to FIGURE 1, the support frame 14 is mounted on four legs 16, which form resilient springs. The feeder pan 18 is resiliently mounted with respect to the frame 14 by means of the leaf springs 20, which are connected to the frame 14 by spring mounting blocks 22 secured to the shafts 24 by appropriate means, and to the pan 18 by spring mounting blocks 26, secured to the shafts 28. The shafts 24 are attached to the frame 14 by brackets 30, and the shafts 28 are attached to the feeder pan 18 by brackets 32. The feeder pan 18 has an inlet end 19 and an outlet end 21, and is provided with an elongate slot 34 at the outlet end, which permits material to be dispensed from the feeder pan.

The oscillator 10 is comprised of a housing 36 which is mounted adjacent one end of the frame 14 and is attached thereto by means of mounting hubs 38. A motor 40 is attached to the housing 36 by the mounting bracket 42, and is provided with a sheave 44. A sheave 46, keyed to a shaft 48 rotatably mounted in the housing 36, is driven by the motor 40 by means of a belt 52.

FIG. 3 illustrates the oscillator 10 in detail. The housing 36 is comprised of a main body 54, and a cover 56 secured to the body 54 by bolts 58. Rotatably mounted within the housing are two parallel shafts, the drive shaft 48 and a driven shaft 50. The drive shaft 48 is journaled in the body 54 and the cover 56 by bearings 60 and 62 respectively. As noted above, the sheave 46 is fixedly attached to the shaft 48, by a key 64, and it is separated from the cover by a spacer 66. The shaft 50 is journaled in the housing 36 in a manner similar to that of the shaft 48.

A third shaft 68 is rotatably journaled in the body 54 and the cover 56 by means of bearings 70 and 72 respectively, in such a manner that it is parallel to the shafts 48 and 50 and disposed therebetween. A knob or handle 74 is provided for rotating the shaft 68 relative to the housing 36. The shaft 68 has a threaded portion 76 which threadedly engages an adjusting arm or member 78. The arm 78 slidably engages each of the shafts 48 and 50 and is adapted to slide along the longitudinal axis of the shafts 48 and 50 when the shaft 68 is caused to rotate.

An adjusting slide 80 is slidably mounted on the shaft 48 and it is provided with a shoulder 82 which seats a bearing 84. A snap ring 86 fixedly connects the bearing 84 to the slide 80. The slide 80 and the bearing 84 are positioned within an opening 88 in the adjusting arm 78 so that the bearing 84 abuts against a shoulder 90 in the adjusting arm. A retaining ring 92 prevents the bearing 84 from moving relative to the arm 78. The arm 78 is slidably connected to the shaft 50 in the same manner as described above in connection with the shaft 48, and will not be described in further detail.

Figure 5:
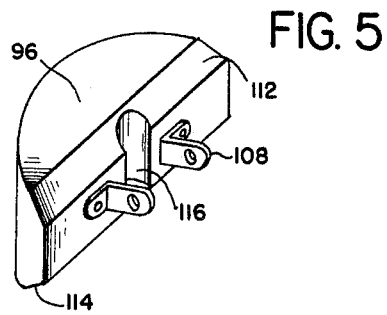
FIG. 5 is a perspective view illustrating an eccentric weight used in the oscillator.

Two pegs or pins 94 are connected to the shaft 48 by inserting them in bores 93 in the shaft, in such a manner that they are normal to the longitudinal axis of the shaft. An eccentric weight 96, which is provided with two bores 95, is slidably mounted on the pegs 94 in such a manner that it is adapted to slide radially away from or toward the axis of the shaft 48. The weight is operatively connected to the adjusting arm 78 by a linkage designated generally by reference numeral 97. The linkage 97 is comprised of a first pair of links or connecting arms 98 and a second pair of links or connecting arms 100. The arms 98 are connected at one end to the adjusting slide 80 and at the other end to a slide pin 102, which is slidably retained within a curved opening 104 in a support member 106, the latter member being attached to the shaft 48. The arms 100 are likewise connected at one end to the slide pin 102, and at the other end to a lug 108 which is attached to the weight 96. A second weight 110 is attached to the shaft 50 and operatively connected to the adjusting arm 78 in a similar manner. Note that portions of the weights 96 and 110 are removed to form inclined surfaces 112 and 114, and note further that each weight has a hemispherical portion 116 removed therefrom. In this connection note FIG. 5 as well.

A plurality of spur gears 118, 120, 122 and 124 are provided for operatively connecting the shaft 48 to the shaft 50, in such a manner that the shaft 50 is caused to rotate in a direction opposite to that of the shaft 48, as the shaft 48 is caused to rotate in one direction. It should be understood of course, that other means of connecting these shafts together could be used as well, such as a chain or belt. A gear housing 126 effectively covers the gears, and if desired, it might be at least partially filled with a lubricant for lubricating the gears.

In operation, the shaft 48 is rotated by means of the motor 40. As the shaft 48 is caused to rotate in one direction, the shaft 50 is caused to rotate in the opposite direction, as described above. The eccentric weights 96 and 110 rotate with the shafts about the longitudinal axis of the shafts, and they are positioned relative to their respective shafts 48 and 50 on the pegs 94, by means of the adjusting arm 78 and the linkage 97. By rotating the shaft 68 about its axis, the radial distance of the weights with respect to the axis of the shafts can be varied; and the magnitude of the vibratory force created by the oscillator can be varied from a minimum force to a maximum force, or vice-versa, while the shafts are rotating. As the shaft 68 is rotated, the adjusting arm 78 is caused to move axially with respect to all three shafts (or up and down as viewed in FIG. 3). As noted further in FIG. 3, the arm 78 is positioned at the top of the housing, and the weight 96, by virtue of the linkage 97 is positioned radially away from the shaft 48 as far as it will go. The weight 110 is normally maintained in the same position with respect to the shaft 50, as the weight 96 relative to the shaft 48. When both of the eccentric weights 96 and 100 are in the position of weight 96, a vibratory force of maximum magnitude will be produced by the oscillator.

For purposes of illustration, the weight 110 is shown positioned adjacent to the shaft 50, thus depicting the position of the weights when a minimum vibratory force is created by the oscillator. Note that the inclined surface 112 and the hemispherical opening 116 permit the weight to be positioned very close to the shaft 50. When both of the eccentric weights are in this position, a minimum vibratory force is created by the oscillator. As the weights are caused to move away from their respective shafts however, a vibratory force is created varying in magnitude from a minimum force when the weights are positioned proximate their respective shafts, to a maximum force when they are in the position of the weight 96 as shown in FIG. 3.

FIG. 6 illustrates another embodiment of the invention whereby a variable force is produced by an oscillator, while the oscillator is in operation. Note that only one of the rotating shafts is shown; however, the general configuration of the oscillator is similar to that illustrated in FIG. 3. In this embodiment, a shaft 150, having a sheave 152 and a gear 154 attached to its two ends, is rotatably mounted in the oscillator housing 156 by means of bearings 158 and 160. An adjusting slide 162 is slidably mounted on the shaft 150; and a band 164 encircles the slide 162 in such a manner that an annular opening 166 is formed between the slide and the band. A plurality of U-shaped support members 167 fixedly connect the band 164 to the slide 162. A sleeve 168 is fixedly connected to the shaft 150 near the base of the housing 156. An eccentric weight 170 is operatively connected to the shaft 150, and is adapted to rotate about the longitudinal axis of the shaft as the shaft is rotated, by means of a first pair of arms 172 and a second pair of arms 174, which connect the weight 170 to the adjusting slide 162 and the sleeve 168 respectively.

A shaft 176, journaled in the housing 156 by appropriate means, is provided with a threaded portion 178 thereon, which engages an adjusting arm 180. The arm 180 has a forked end 181 with a projection 182 on each fork which engages the adjusting slide 162, by projecting through the opening 166 formed by the slide 162 and the band 164. A snap ring 184 retains the projections 182 in place relative to the slide 162. A knob or crank is used to rotate the shaft 176.

The operation of this embodiment is substantially the same as that described in connection with FIG. 3. As the shaft 150 is caused to rotate, the eccentric weight 170 is likewise caused to rotate about the longitudinal axis of the shaft 150. By rotating the shaft 176, the adjusting arm is caused to move axially relative to the shafts 150 and 178, thereby causing the slide 162 to slide axially with respect to the shaft 150. As the axial position of the slide 162 changes, the radial distance of the weight 170 relative to the longitudinal axis of the shaft varies from a minimum when the weight 170 is pulled substantially adjacent to the shaft 150 (and the adjusting arm 180 is at the top of the housing as viewed in FIG. 6) to a maximum when the weight 170 is forced as far away from the shaft 150 as the connecting arms 172 and 174 will permit (and the adjusting arm 180 is moved toward the bottom of the housing 156 as viewed in FIG. 6). A second shaft having an eccentric weight attached thereto (not shown in FIG. 6) is caused to rotate in the opposite direction to that of the shaft 150, by appropriate means. The magnitude of vibratory force produced by the oscillator can be varied while the shaft 150 and the counter rotating shaft are rotating, from a minimum to a maximum magnitude, or vice-versa, by a simple adjustment of the shaft 176.

The variable force oscillators described above, can be used for producing a vibratory force and imparting a vibratory motion to different types of devices, such as a conveyor. By a simple adjustment, the amplitude of vibration of the vibrating body can be varied from a minimum magnitude to a predetermined maximum magnitude, by adjusting the radial distance of a pair of eccentric weights with respect to a pair of rotating shafts, while the oscillator is being actuated. It should be recognized further, that although the oscillator has been illustrated in connection with a horizontal conveyor or feeder, it is envisioned that it might also be used with other types of conveyors, such as vertical or spiral conveyors where a vibratory motion might be desired, with minor modifications which one skilled in the art could accomplish. Furthermore, it is envisioned that in some instances, a single shaft having an eccentric weight connected to it might be used, for example as a gyratory drive for a gyratory sifter or the like; and means could be provided to change the radial position of the weight with respect to the shaft while the shaft is rotating, thereby varying the magnitude of vibratory gyratory force created by the apparatus.

Now therefore we claim:

1. An oscillator for producing a vibratory force comprising a housing, a pair of parallel shafts rotatably mounted in said housing, means for rotating said shafts in opposite directions, a pair of eccentric weights within the housing, each weight having at least one bore extending therethrough, first means for connecting one of said weights to one shaft so that it is disposed proximate the surface of said shaft, second means for connecting the other weight to the other shaft so that it is disposed proximate the surface of said other shaft and phased 180° apart with respect to the first eccentric weight when the weights are perpendicular to the direction of motion produced by the oscillator, said first and second means including at least one radially extending peg connected to each shaft, each weight being slidably mounted on said peg, a third shaft rotatably mounted in the housing, said third shaft being parallel to the first two shafts and positioned therebetween, an elongate arm member positioned within the housing threadedly mounted on said third shaft, the ends of said arm member being slidably mounted within the housing on the first two shafts, said member adapted to slide axially along the axis of the shafts, and means for connecting each end of said arm member to one of the eccentric weights, said means including a pair of linkages, each linkage including first and second links, means for pivotally connecting one end of the first and second links of each linkage together, means for pivotally connecting the other end of said first link of each pair of linkages to one of the weights, means for pivotally connecting the other end of the second link of said pair to the arm member, each eccentric weight being caused to move radially relative to its respective shaft in response to axial movement of said arm member relative to the third shaft.

2. An oscillator for producing a vibratory force comprising a housing, a pair of parallel shafts rotatably mounted in said housing, means for rotating said shafts in opposite directions, a pair of eccentric weights within the housing, first means for connecting one of said weights to one shaft so that it is disposed proximate the surface of said shaft, second means for connecting the other weight to the other shaft so that it is disposed proximate the surface of said other shaft and phased 180° apart with respect to the first eccentric weight when the weights are perpendicular to the direction of motion produced by the oscillator, said first and second means including a pair of sleeve members mounted on each shaft and linkage means for connecting one weight to the pair of sleeve members on one shaft, one of said sleeve members being slidably mounted on the shaft and the other sleeve member being fixedly connected to the shaft, each linkage means including a pair of links, means for pivotally connecting one link of each pair to the weight and the slidable sleeve member, means for pivotally connecting the second link of each pair to the weight and the fixed sleeve member, and means for adjusting the radial distance of each weight with respect to the axis of its respective shaft by moving the slidable sleeve member along the shaft while the shafts are rotating thereby varying the component of vibratory force produced by the oscillator, said means including a third shaft which is parallel to the first two shafts and which is rotatably mounted in the housing and an elongate arm member positioned within the housing threadedly mounted on said third shaft, the ends of said arm member engaging the slidable sleeve members on the parallel shafts in such a manner that each eccentric weight is caused to move radially relative to its respective shaft in response to axial movement of said arm member relative to the third shaft.

3. An oscillator for producing a vibratory force comprising a housing, a pair of parallel shafts rotatably mounted in said housing, a pair of eccentric weights within the housing, means for connecting one of said weights to one shaft so that it is disposed proximate the surface of said shaft, said means including a first linkage comprised of first and second links, said links being pivotally connected together at one end, means for connecting the other weight to the other shaft so that it is disposed proximate the surface of said other shaft, said means including a second linkage comprised of first and second links, said links being pivotally connected together at one end, said weights being positioned with respect to each other so that a desired phase relationship exists, means for rotating said shafts in opposite directions a third shaft rotatably mounted in the housing, said third shaft being parallel to the first two shafts and positioned therebetween, an elongate arm member positioned within the housing threadedly mounted on said third shaft and slidably mounted on the first two shafts, and means for operatively connecting the ends of said arm member to the eccentric weights in such a manner that rotation of said third shaft causes axial movement of said arm member relative to the third shaft within the housing, said means including the first and second linkages which connect the weights to their respective shafts, means for pivotally connecting the other end of the first link of each linkage to the arm member, means for pivotally connecting the other end of the second link of each linkage to one of the weights, axial movement of said arm member relative to the third shaft causing the eccentric weights to move radially relative to their respective shafts while the shafts are rotating thereby varying the component of vibratory force produced by the oscillator.

References Cited by the Examiner

UNITED STATES PATENTS

| 2,353,492 | 7/1944 | O'Connor | 74—61 X |
| 2,445,175 | 7/1948 | Hittson | 74—61 |
| 2,516,335 | 7/1950 | Nevin et al. | 74—61 |
| 2,921,477 | 1/1960 | Hanggi | 74—87 |
| 2,951,581 | 9/1960 | Long et al. | 198—220 |
| 3,144,009 | 8/1964 | Goodfellow et al. | 74—567 X |

FOREIGN PATENTS 116,921   7/1946   Sweden.

MILTON KAUFMAN, *Primary Examiner.*

BROUGHTON G. DURHAM, *Examiner.*

D. H. THIEL, *Assistant Examiner.*